Nov. 26, 1968     CHI FANG TUNG ETAL     3,413,058

REFLEX-REFLECTING ARTICLES

Original Filed Aug. 7, 1963

CHI FANG TUNG
PHILIP V. PALMQUIST
INVENTORS

BY

*Carpenter Abbott Coulter & Kinney*
ATTORNEYS

United States Patent Office 3,413,058
Patented Nov. 26, 1968

3,413,058
REFLEX-REFLECTING ARTICLES
Chi Fang Tung, Lincoln Township, Washington County, and Philip V. Palmquist, Maplewood, Minn., assignors to Minnesota Mining and Manufacturing Company, St. Paul, Minn., a corporation of Delaware
Continuation-in-part of application Ser. No. 300,475, Aug. 7, 1963. This application July 9, 1964, Ser. No. 381,459
9 Claims. (Cl. 350—105)

ABSTRACT OF THE DISCLOSURE

Reflex-reflecting articles having a compact layer of glass beads held in position on a metal substrate layer, the beads being embedded in and held in position solely by a substrate of malleable and ductile metal. Such articles may be formed by pressing the beads into the metal substrate under elevated temperature conditions, no adhesive being required to effect the bonding of the beads to the metal substrate.

This application is a continuation-in-part of our application Ser. No. 300,475, filed Aug. 7, 1963 now Patent No. 3,292,029.

This invention relates to reflex-reflecting articles of the type having a compact monolayer of discrete small transparent glass beads and underlying specular hemispherical reflective means in association therewith. More particularly, this invention is directed to reflex-reflecting articles of the foregoing type formed by pressing a compact monolayer of glass beads into a metal substrate layer to a partial extent at least equal to or greater than half the diameter of the beads and no greater than about 85% of the diameter thereof.

A key feature of the present invention rests in the means by which the glass beads are held in position in the reflex-reflecting articles hereof. Heretofore, glass beads have been held or bonded in position in reflex-reflecting structures either by organic binder material or by glassy enamel inorganic binder material. In either case, the essential bonding media for the beads has been separate or distinct from the specular metallic reflective material in the prior art reflex-reflecting structures.

The present invention provides a new combination and relationship between a compact monolayer of glass beads and the underlying specular reflective means and the bonding means for the beads. According to the present teaching, the specular reflective material serves also as the bonding means to retain and hold the glass beads in compact monolayer condition against dislodgment.

Structures of the invention are especially desirable from the standpoint of their resistance to weathering as well as vandal damage. For the first time, insofar as we are aware, street signs as well as other signs replaced or repaired only at very infrequent intervals may, as a practical matter, be formed so as to be reflex-reflecting and yet possess durability and wearability and long-life as required.

Reflex-reflecting sheet articles may be formed according to the invention without a trace of organic matter in their make-up. Such structures, particularly in the form of discs or other stamped shapes, may be useful in elevated temperature environments (e.g., sealed-beam headlights), where materials which volatilize are to be held to a minimum or are to be excluded altogether. In many cases the presence or absence of organic material is relatively less critical; but the substantial absence of organic material, particularly as organic bonding material for the glass beads, is desired from the standpoint of wearability, durability and long life of the reflex-reflecting structure. Structures of the present invention satisfy such requirements. However, if desired, structures of the invention may have added to them a layer or layers of organic material for special purposes. Such structures represent useful extensions of the fundamental teaching hereof. They possess the fundamental requirements of the present invention, specifically the joint metal bonding and specular reflectorization of the glass beads or microspheres as to be discussed.

The invention will be described by reference to a drawing, made a part hereof, wherein.

Figure 1:
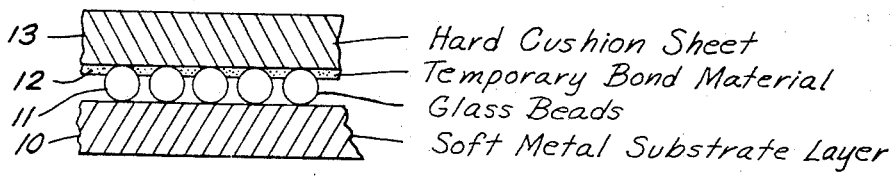
FIGURE 1 is a schematic cross-section through an assembly of parts as arranged preliminary to the pressing step required for making structures according to the invention.

In making reflex-reflecting structures of the present invention, an assembly of parts arranged illustratively in the manner illustrated in FIGURE 1 is first formed. The metal selected for the soft metal substrate layer 10 into which the transparent glass beads 11 are partially embedded is one having a deformation strength less than the crushing strength of the glass beads employed in the structure. Stated another way, the Knoop hardness of the metal substrate must be less than (preferably no more than 30% of) the Knoop hardness of the glass beads for the structure. Known glass beads of practical use in reflex-reflecting applications have crushing strengths and Knoop hardness values significantly higher than, for example, the metal aluminum, which is a preferred metal for use in the structures herein discussed. Other metals having desirable Knoop hardness values and ductility and malleability as required for use as substrate metal are copper, lead, zin, tin, gold, silver, magnesium, and the like. Alloys as well as laminates of different metal layers are useful for substrate metal purposes where the surface layer exhibits the essential relationship to the glass beads as herein required.

Transparent glass beads 11 selected for the structure should have a refractive index ($n_D$) of at least about 1.7, with indices (or effective indices) as high as 2.5 or even 2.9 being useful in special structures formed according to the teaching hereof. Generally, where lenticular-surfaced structures are to be employed, the refractive index of the exposed lens elements (i.e., the glass beads or microspheres) will not exceed about 2.0. It preferably will be at least about 1.8. Where flat-surfaced structures are formed by coating the exposed lenticular elements with transparent solids material (see FIGURES 5 and 6), effective refractive indices as high as 2.9 and as low as about 2.4 or 2.5 for the beads are useful. Still other refractive indices may be employed in both the lenticular and flat surfaced structures for varied effects, but usually with somewhat less efficiency of light retro-reflection as compared to the preferred indices noted.

It should be noted that the flat-surfaced structures of the present invention do not have an organic space coat between the underlying specular-reflecting surface and the glass beads of the structure; such space coats have heretofore been common and even critical in many heretofore-known flat-surfaced structures in order to gain desired improved light return.

In order to form reflex-reflecting structures of the invention so that they are essentially or entirely free of organic material, the surface of the metal substrate layer into which the glass beads are to be pressed as well as the surface of the beads themselves are both cleaned to remove organic material. Cleaning of these surfaces is readily accomplished using any suitable known cleaning techniques. Since formation and control of a monolayer of glass beads is a difficult task without the aid of some material to hold the glass beads in position, at least on a temporary basis, it becomes evident that a temporary bonding material 12, generally of organic character, for the monolayer of glass beads should be employed. The temporary organic bond material may be coated on the surface of the metal substrate layer where the presence of a trace of organic material in the final article is not objectionable; but the temporary bond material should not be so coated where even small traces of organic matter may be objectionable in the final product. In such cases, the temporary bond material is placed on a separate surface, e.g., the surface of a cushion sheet 13 as illustrated in FIGURE 1; and this temporary bond layer then may be used to carry a monolayer of glass beads in position over the metal substrate layer for pressing into the metal substrate layer.

Figure 2:
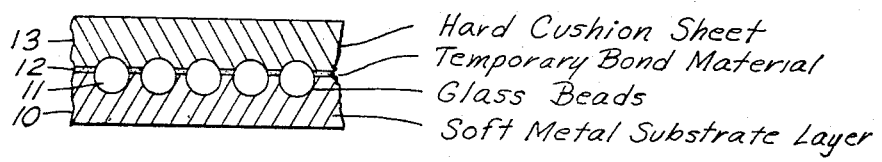
FIGURE 2 is a schematic cross-section through the assembly of parts shown in FIGURE 1 after the pressing step is completed.
Figure 3:
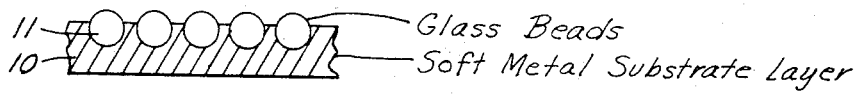
FIGURE 3 is a schematic cross-section through a reflex-reflecting sheet structure of the present invention formed according to the procedure illustrated in FIGURES 1 and 2.

In essence, therefore, by forming an assembly as illustrated in FIGURE 1 and then pressing that assembly into the relationship between parts as illustrated in FIGURE 2, one forms the final article as illustrated in FIGURE 3. The beaded surface of this article is easily washed or cleaned to be essentially free of organic material. Thus is formed a reflex-reflecting structure capable of withstanding relatively high temperatures without deterioration or contamination of an atmosphere in which it is placed.

Of course, the cushion sheet 13 in the procedure just discussed must have a hardness in excess of that of the metal substrate layer into which glass beads are to be pressed and preferably less than that of the glass beads so that a small pitting and therefore "gripping" of the glass beads by the "cushion" sheet occurs during the pressing operation. In this manner rolling and disruption of the monolayer of glass beads is obviated during the pressing operation.

Where minor contamination of a lenticular structure with organic material is not objectionable, the temporary bond 12 aforediscussed may, of course, be applied to the surface substrate metal instead of the removable cushion sheet of metal. Any resulting fractional content of organic material which may be entrapped beneath the glass beads substantially embedded in the substrate metal does not interfere with, nor detract from, the true bond function of the substrate metal and the specular-reflective function thereof.

It will be appreciated that both sides of a substrate metal sheet may be provided with beads partially embedded and in monolayer condition so that the final substrate sheet will be reflex-reflective from both sides. A specific illustration of this will now be given. An illustrative base metal sheet or soft metal substrate layer for such a structure is a 32 mil thick malleable and ductile aluminum sheet consisting essentially of 99.5% aluminum with about 0.5 impurities. Its Knoop hardness is about 23.81. Both surfaces of the sheet are cleaned in a conventional manner to be free of dirt and grease. Two other sheets, called cushion sheets, are likewise cleaned. The hardness of these cushion sheets is in excess of that of the malleable and ductile aluminum sheet which becomes part of the reflex-reflecting composite. Suitable flat-surfaced cushion sheets are formed of aluminum alloys having a Knoop hardness of about 43.34. One side of each cushion sheet is coated with a thin film (no greater in thickness than about one-half the diameter of the glass beads or microspheres selected for the final structure, preferably thinner and between about 0.5 micron and 10 microns) of a temporary binder material; and for this purpose oil is entirely effective. Transparent glass beads having a refractive index of 1.92 and a diameter in the range of 60 to 75 microns are then formed into a monolayer over each oil coated surface of the cushion sheets by sprinkling the beads thereover and dumping off any excess. The beads are noted to be such that they can withstand elevated temperatures at least as high as about 500° C. or 600° C. without softening. It is, however, only critical that the beads or microspheres be such that they do not soften under the particular temperature conditions employed in pressing. Then the cleaned malleable and ductile aluminum sheet is placed between the cushion sheets (with the monolayer of beads on each cushion sheet facing toward the malleable and ductile sheets and in contact therewith), and the assembly then passed between co-acting cylinders which serve to subject the assembly to pressure. A pressure of about 3200 p.s.i. at a temperature of about 550° F. is sufficient to press the beads into the malleable and ductile sheet and partially embed them with good adhesion. Slight deformation pockets may be noted in the cushion sheets upon removal from the assembly, but they are not objectionable and may aid in achieving bonding into the central ductile sheet. The monolayers of glass beads partially embedded and bonded in the ductile sheets are then cleaned with solvent for the temporary binder so as to remove any which may have adhered to the surface of the beads or transferred with the beads to the central malleable and ductile sheet. The final malleable and ductile sheet, with beads embedded in both sides thereof to about 60% of their diameter, may then be die cut into shapes as desired and pressed or die shaped or embossed into concave or other forms useful for any reflex-reflective purpose as desired. It is especially useful in sealed-beam headlamp applications.

Glass beads for partial embedding in metal according to the invention should have a diameter such that at least 90% of the mass thereof falls within a limited size range such that the upper size limit of that range is no larger than about 30% greater than the lower size limit within that range. Very excellent results are gained using beads varying from about 60 to 75 microns in diameter; but beads as small as about 20 microns in diameter (or even somewhat smaller) and as large as about 200 microns in diameter (or slightly larger) may be used to gain the results taught therein. Preferably, however, the size of the glass beads or microspheres employed in forming the structures will not exceed about 125 microns or even 100 microns in diameter.

The beads are in all cases pressed into the ductile and malleable base sheet or layer to such extent that they are at least partially embedded in an approximately hemispherical manner. Indeed, those beads within the 90% weight range aforenoted are embedded to an extent or depth greater than half the diameter thereof, usually about 60% of the diameter thereof, up to about 85% of the diameter thereof. They thus are firmly gripped by the metal of the substrate layer; and ths gripping extends in a lateral direction within the layer structure as well as possibly in other directions. In essence, they are permanently held by the lateral compressive forces exerted by the metal of the substrate layer. These lateral compressive forces, of course, become the more pronounced in those cases where the layer structure is formed under elevated temperature conditions.

Indeed, while reflex-reflecting structures consisting of glass beads and metal may be formed at normal room temperature conditions using pressure, it is much preferred to form the structure by pressing the glass beads partially into the metal at slightly elevated temperatures up to approximately 20° C. below the melting point of the metal. Processing under elevated temperature conditions advantageously imparts to the final sheet product an improved bonding or gripping of beads by the metal. This is particularly true with respect to the lateral compressive holding forces developed within the structure. In fact, even when the sheet product is maintained in flat stock form, beads in it are under some compression when the product is formed using heat and pressure to partially embed the beads in the metal. Regardless of whether or not the flat sheet stock is formed using external heat (or elevated temperatures) with pressure, subsequent stamping of a shield or other part to form a concave structure will cause partially embedded beads to be under compression in the concave side of the structure. Further, even room temperature pressing is accompanied by the generation of some heat within the metal undergoing the deformation to accept the glass beads; and this in turn contributes to development of lateral compressive forces upon cooling.

The metal selected for use in forming metal bonded structures will usually be selected for its specular-reflecting properties in addition to its ductility. An excellent material to use in this respect is aluminum substantially free of other metals. However, where a ductile base metal is considered suitable for use (e.g., lead) but lacks the particularly specular-reflecting properties of color desired, it is convenient to apply a thin layer of specular-reflecting metal (e.g., a layer of vapor deposited aluminum) over the base metal selected for use and rely upon the specular reflectance properties exhibited by the veneered metal which deforms and caps itself about beads partially embedded into the veneered side of the base structure. Also, if desired, pre-metallized (e.g., presilvered) beads may be used in forming a metal bonded structure, followed by etch removal of the external portion of the coated beads not embedded; but greater simplicity is possible by use of a base metal possessing both the specular-reflectance properties and softness required for pressing beads therein.

The thickness of a malleable and ductile substrate metal layer 10 should be at least equal or in excess of half the diameter of the glass beads to be partially embedded therein. Generally, the thickness is at least 2 mils (and the beads are about 50–75 microns), but the layer may be as thin as 0.5 mil or even 1 mil where very small small glass beads are employed. Also, it may be as thick as 5, 10 or even 40 or 50 mils, or even more, particularly when the metal performs additional functions beyond those expressly recited.

Figure 4:
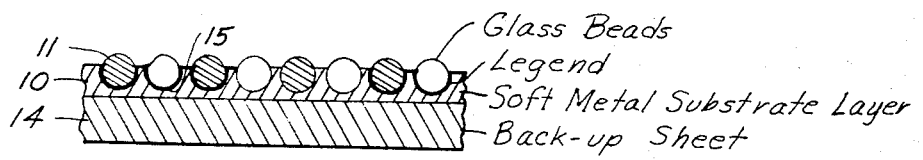
FIGURE 4 is a schematic cross-section through an alternate lenticular-surfaced structure of the invention.

An interesting alternative embodiment of the invention is illustrated in FIGURE 4. There the soft metal substrate layer 10 is relatively thin (e.g., two or three mils thick) and is carried as a layer on a back-up sheet 14 of, for example, iron or steel. A specific illustrative composite of this type is tin-clad iron where the tin coating is of suitable thickness as required. It is essential, where the back-up sheet 14 lacks the properties of ductility and the like required for the substrate layer 10, that the tin or analogous coating be of the thickness aforediscussed for the substrate metal layer 10. On the other hand, where the back-up sheet does possess the properties of ductility and softness required for the substrate layer, the tin or other coating on the back-up sheet may be extremely thin, as the total composite of layer 10 and sheet 14 would then serve to satisfy the soft metal substrate requirements.

Also illustrated in FIGURE 4 is a permanent legend marking 15 as part of the reflex-reflecting article. Material of the legend 15 is entrapped and sealed between the underside or embedded portion of beads 11 and the cup of the metal of the substrate layer 10 holding the beads. In forming the structure, the material of the legend marking is coated (as by painting, printing, or the like) upon the face of the substrate layer 10 in the shape desired for the legend. Any suitable coloring matter (chromatic or achromatic), whether pigmented or transparent, may be used. A specific illustrative ink is black ink consisting essentially of a nigrosine black base in a coumarone-indene coal tar resin diluted by naphtha as a volatile liquid. A legend made with this material is allowed to dry so as to remove essentially all volatile ingredients (e.g., the naphtha); and then the glass beads 11 are placed over the legend areas and nonlegend areas of the substrate layer and pressed therein. They push into that layer the legend marking material where it is present beneath a bead. Thus is formed a vandal-proof legend marking in the reflex-reflecting structure.

FIGURE 4 is also conveniently referred to for the purpose of illustrating that some of the glass beads of a sheet structure may, if desired, be selected for their ability to function in a specialized manner under certain conditions as compared to other beads present in a composite monolayer of a structure according to the invention. For example, those beads cross-hatched in FIGURE 4 may exhibit a refractive index of about 2.4 to 2.6, which is within the range for effective refraction at an interface between the exposed portion of the beads and a film of water thereover. Other beads of the monolayer of FIGURE 4 may exhibit a refractive index of about 1.8 to 2.0, which is within the range of refractive index for reflex-reflection when the exposed lenticular surface of the beads is open to the air. Specifically, in forming a lenticular-surfaced structure which exhibits effective reflex-reflection of light when dry as well as when coated with a film of water, it is suitable to apply a mass of beads of about 60 to 75 microns diameter and about 2.5 to 2.56 refractive index over the oil film on a cushion sheet so that approximately two-thirds of the open areas of the cushion sheet is covered. The beads so applied should not be placed in a compact monolayer; the monolayer should be loose with openings between beads thereof. Then the remaining one-third of the surface area is covered with beads of essentially the same diameter but having a refractive index of about 1.9. Any excess is blown off with low pressure air. The entire composite may then be pressed into a soft metal substrate layer (such as tin-clad iron) at about 150–200° C. and a pressure of about 3,000 p.s.i. for about one minute.

Figure 5:
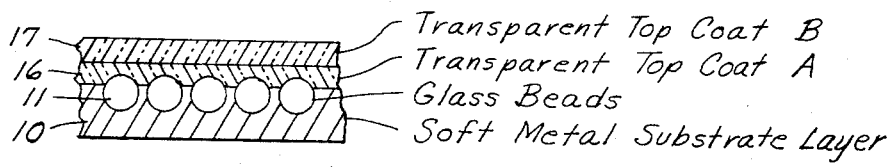
FIGURES 5 and 6 are schematic cross-sections through flat-surfaced reflex-reflecting structures having the critical features of the invention.
Figure 6:
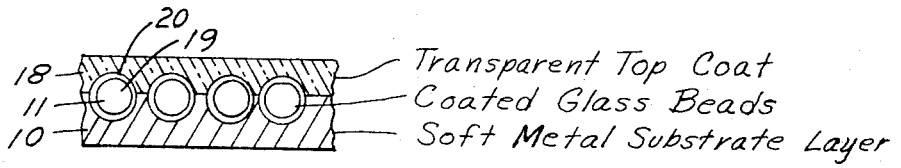

The structures illustrated in FIGURES 5 and 6 are particularly interesting inasmuch as they include all the essential features of the present invention, but additionally have a top layer structure such that flatness is imparted to the surface of the reflex-reflecting composite. Illustratively, the structure of FIGURE 5 may be formed by using a layer of aluminum having a Knoop hardness of about 23.34 and a thickness of about 5 mils, plus glass beads of approximately 40 to 60 microns in diameter and a refractive index of about 2.68. The beads are pressed into the aluminum up to about 60% of their diameter using a temperature of about 550° F. and a pressure of about 3,000 p.s.i. for 2 minutes. Then the lenticular surface is cleaned by using any conventional cleaning solution, rinsed and dried. Over this cleaned surface is then applied a layer about 2 mils thick of a solution of 33.3% fluoro elastomer ("Viton A") solids in methyl isobutyl ketone. The fluoro elastomer contained about 80 mol percent vinylidene fluoride and 20 mol percent hexafluoropropene. It is interesting in that it exhibits a refractive index of about 1.38. It was cured for about 150° F. for 30 minutes; but it is relatively soft and rubbery and relatively easily damaged. It is to be emphasized, however, that it is very desirable as the material immediately next to the exposed surface of the glass beads of the structure because of the relationship of the refractive index of the glass beads (i.e., 2.68) to the refractive index of the synthetic elastomer (i.e., 1.38). This relationship may be noted to lie between 1.9 and 2.0. Thus the initial topcoat 16 or transparent topcoat A is further covered with a transparent topcoat B, numbered 17 in the drawing, so as to impart satisfactory handling properties and protect other top surface of the sheeting. The second or outermost coating is suitably one of ethyl methacrylate at a thickness of about 2 to 3 mils and applied from a solution such as methyl isobutyl ketone. It is likewise cured at about 150° F., suitably for 15 minutes, and then at 200° F. for 15 minutes. The final structure so formed is such that it will exhibit reflex-reflection of incident light whether the surface is wet or dry; and the brightness of reflex-reflection is consistently about 20 to 25 photovolt units or 200–250 times brighter than diffused white surfaces.

The illustrative flat-topped reflex-reflecting structure illustrated in FIGURE 6 is analogous to that illustrated in FIGURE 5 except that the glass beads 19 are provided with a veneer coating of silicate material to provide resulting coated glass beads having an effective refractive index of about 2.9. Suitable silicate coated glass beads exhibiting such refractive index may be formed according to the teaching of U.S. Letters Patent No. 3,025,764 here incorporated by reference. Illustrative glass beads of refractive index of about 2.2 may be mixed in a slurry of water-soluble silicate (sodium silicate) and then sprayed and dried while free falling to provide a silicate veneer of lower refractive index than the glass beads but of such character as to convert the total composite of the coated glass beads into an article exhibiting an effective refractive index approaching about 2.9. Over the surface of the structure then is applied a layer of about 2 to 3 mils thick of an alkyd resin exhibiting a refractive index of about 1.54 (suitably "Glyptal 2475," a medium oil soya-type alkyd dissolved in mineral spirits at a 60% solids concentration, plus a metallic drier such as cobalt manganese or lead naphthanate). Such a coating, after evaporation of solvent, may be heated at about 200–300° F. for about 20 to 60 minutes to promote curing by the metallic drier. The finished sheeting, whether wet or dry, exhibits a brightness of about 100 times that of white paint.

In any of the several embodiments of the invention, various colors may be imparted to the structure by using colored transparent glass beads with or without colored legend markings as described.

Malleable and ductile metals approaching the hardness of copper (Knoop hardness of 111.4; melting at 1083° C.) are suitable to employ in the "soft metal substrate layer" of the invention. Preferably, however, the metals used in that layer do not exhibit Knoop hardness numbers at room temperature in excess of about 100; and most preferably, they do not exceed about 50. The same metal, depending upon the method employed in fabrication of a sheet of the same, may exhibit varying Knoop hardness numbers under test at room temperature. Thus, it is not practical to speak in terms of a particular group of metals as being suitable and others as being unsuitable for use as the substrate layer in practicing the invention. It is, however, practical to speak in terms of Knoop hardness. Illustratively, sheets or layers of tin (Knoop 6.94; melt 231.9° C.), zinc (Knoop 6.42; melt 419.5° C.), and lead (Knoop 7.43; melt 325.6° C.) were found to be soft, ductile and malleable as required for the substrate layer of the invention. Samples of metals such as gold (Knoop 83.6; melt 1063° C.), silver (Knoop 89.6; melt 960.5° C.) and magnesium (Knoop 65.85; melt 651° C.) have also been used successfully as the substrate metal in practicing the invention. All of these materials have a Knoop hardness at room temperature no greater than 30% that for glass, especially that for the glass of the beads useful in the structure.

That which is claimed is:

1. A reflex-reflecting article comprising a malleable and ductile metal substrate layer and a compact monolayer of a multitude of discrete transparent glass beads having a refractive index of at least about 1.7 and a diameter between about 20 and 200 microns, said metal substrate layer having a Knoop hardness no greater than 30% that of the Knoop hardness of said glass beads, at least about 90 weight percent of the glass beads of said monolayer being within a limited size range having an upper limit of diameter no larger than 30% greater than the lower size limit of diameter within said 90 weight percent portion, said glass beads of said size range being pressed into said metal substrate layer to a partial extent at least greater than one-half the diameter thereof and no greater than 85% of the diameter thereof, such that the glass beads of said size range are each gripped laterally in said layer structure and held permanently in said metal substrate layer solely by lateral compressive forces exerted thereupon by the metal of said metal substrate layer.

2. The article of claim 1 having glass beads of refractive index between 2.4 and 2.6 mixed with glass beads of refractive index between 1.8 and 2.0 such that the article reflex reflects light whether covered with a film of water or free of such film.

3. The article of claim 1 having a legend of contrasting color permanently embedded between the portion of said glass beads pressed into said metal substrate layer and the metal of said substrate layer.

4. The article of claim 1 having a specular-reflecting metal different from the metal of said metal substrate layer permanently embedded between the portion of the glass beads pressed into said metal substrate layer and the metal of said substrate layer, said specular-reflecting metal being in the form of a veneer of approximately hemispherical caps underlying the embedded portion of the glass beads of said article.

5. The article of claim 1 wherein the malleable and ductile metal substrate layer is carried on a base member exhibiting less malleability and ductility than said metal substrate layer.

6. The article of claim 1 having a coating of transparent organic solids material over the portion of the glass beads projecting from the metal substrate layer, said coating of transparent organic solids having a flat front face; the refractive index of the glass beads of said article being at least 2.4 up to about 2.9, and the ratio of the refractive index of the glass beads of said article to the refractive index of transparent organic solids material immediately adjacent the surface of the glass beads of the structure being between 1.8 and 2.0.

7. A reflex-reflecting sheet material consisting essentially of a monolayer of glass beads of refractive index between 1.8 and 2.0 firmly partially embedded in at least one side of a sheet of malleable and ductile metal having a Knoop hardness less than the crushing strength of said glass beads and held permanently in said metal sheet solely by lateral compressive forces exerted thereupon by the metal of said metal sheet.

8. A reflex-reflecting sheet material consisting essentially of a monolayer of glass beads having a refractive index of at least about 1.7 and a diameter between about 20 and 200 microns firmly partially embedded in at least one side of a sheet of malleable and ductile metal having a Knoop hardness less than the crushing strength of said glass beads, said glass beads being held permanently in said metal sheet solely by lateral compressive forces exerted thereupon by said metal, the metal about the underlying embedded portion of the beads in said substrate being specular reflecting.

9. A reflex-reflecting sheet material consisting essentially of a monolayer of glass beads between 20 and 200 microns in diameter, at least 90% of said beads being within a limited size range having an upper limit no larger than 30% greater than the lower size limit, and a sheet of malleable and ductile metal in at least one side of which said beads are firmly partially embedded, said metal having a Knoop hardness less than the crushing strength of said glass beads, the metal about the underlying embedded portion of the beads on said substrate being specular reflecting, and said partially embedded beads being held therein solely by lateral compressive forces within said metal.

References Cited

UNITED STATES PATENTS

| | | |
|---|---|---|
| 2,567,233 | 9/1951 | Palmquist et al. _____ 350—105 |
| 2,568,126 | 9/1951 | Keeley _____ 350—105 X |
| 2,713,286 | 7/1955 | Taylor _____ 350—105 |
| 2,948,191 | 8/1960 | Hodgson et al. _____ 350—105 |
| 3,025,764 | 3/1962 | McKenzie _____ 350—105 |
| 3,005,382 | 10/1961 | Weber _____ 350—105 |
| 3,190,178 | 6/1965 | McKenzie _____ 350—105 |
| 3,288,618 | 11/1966 | De Vries _____ 350—105 XR |

DAVID SCHONBERG, *Primary Examiner.*

P. R. GILLIAM, *Assistant Examiner.*